United States Patent Office 3,254,058
Patented May 31, 1966

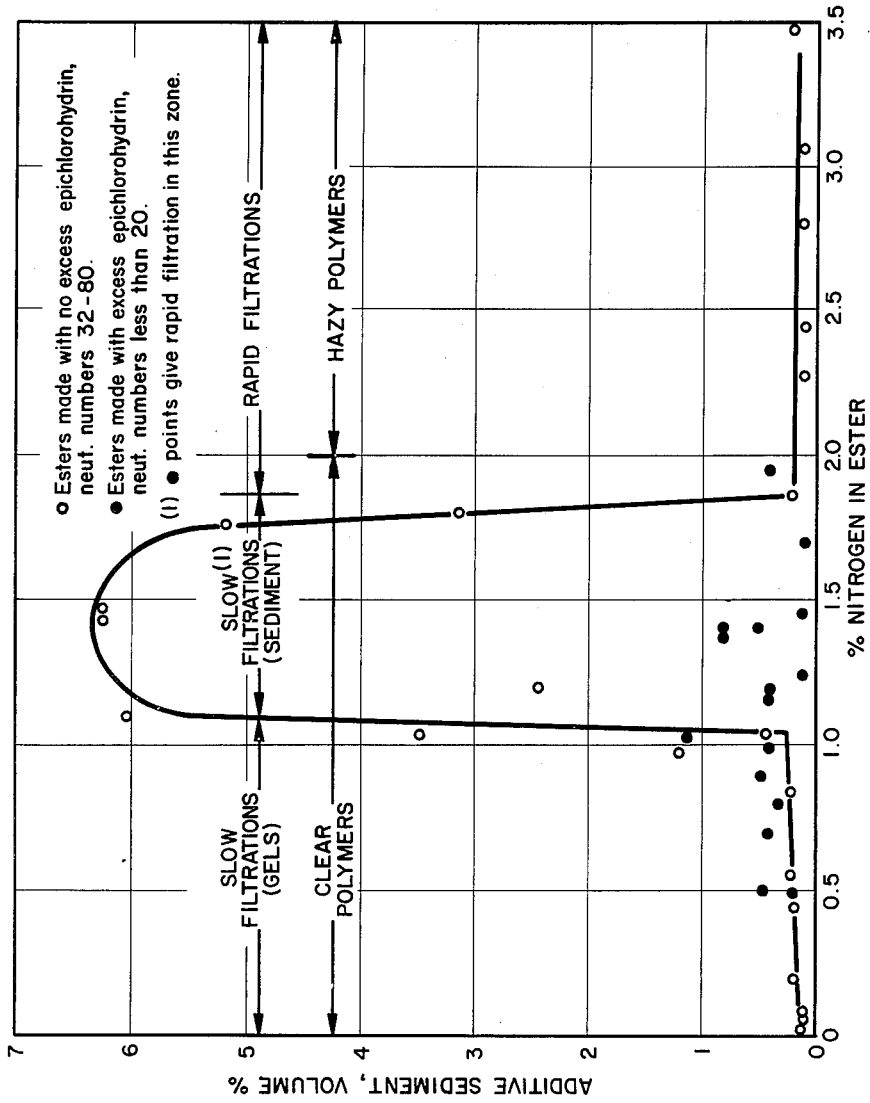

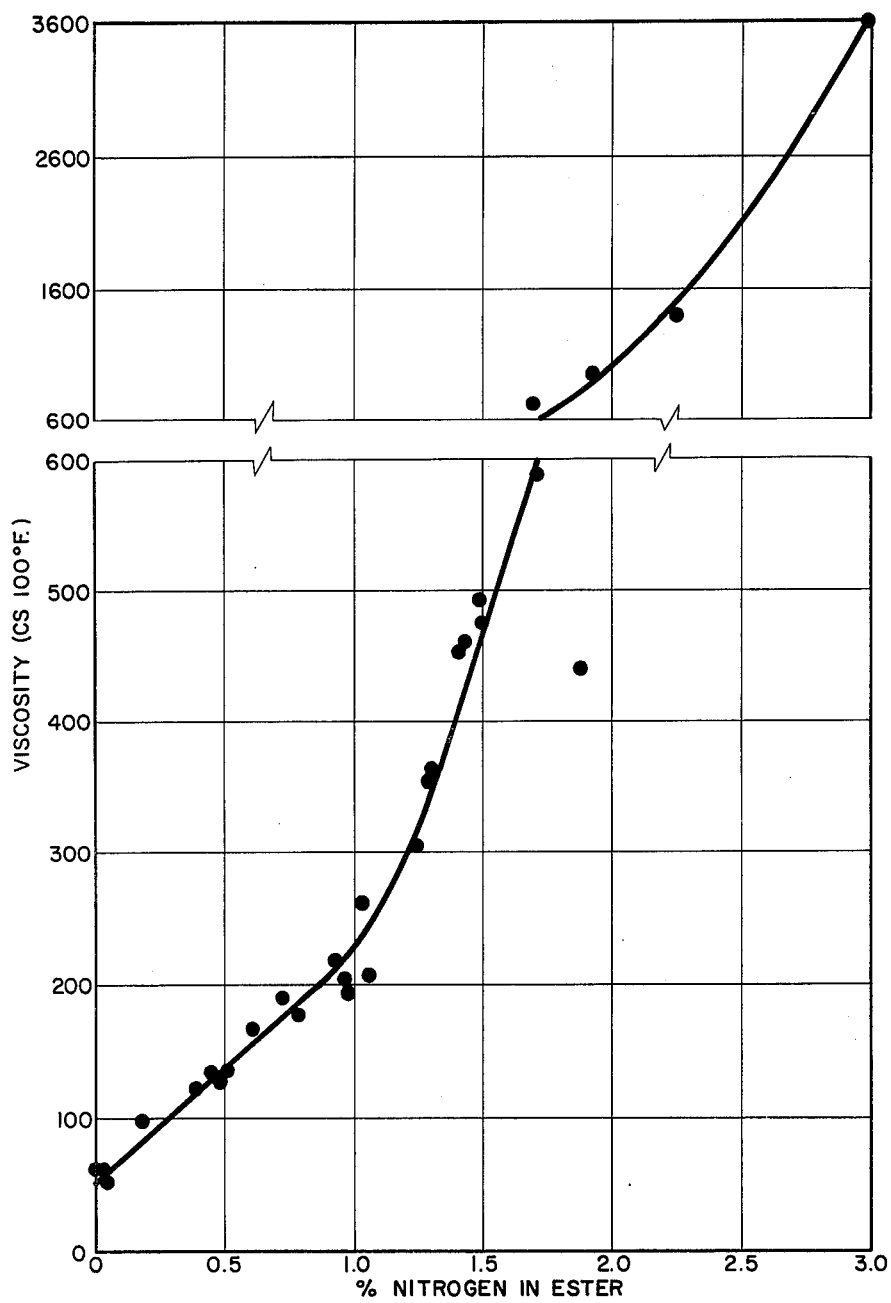

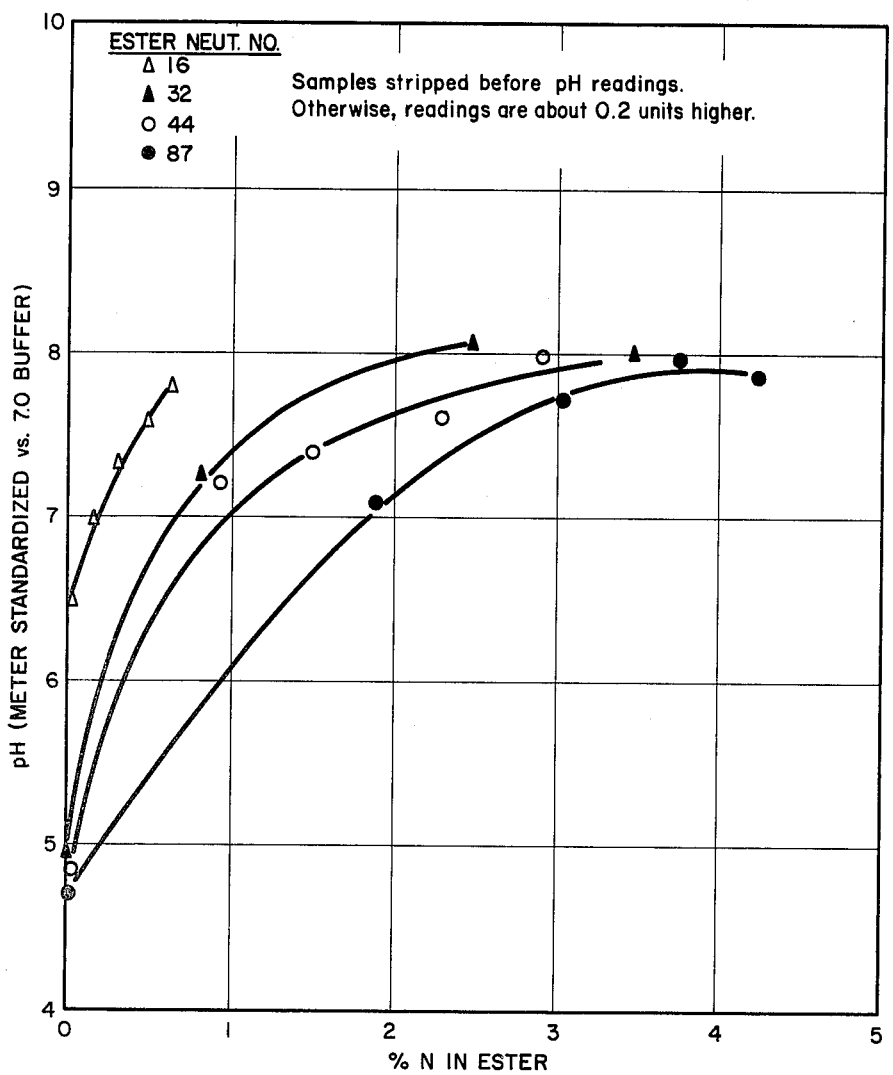

3,254,058
GEL AND SEDIMENT PREVENTION IN POLYMERIC ADDITIVES FOR HYDROCARBON OILS
Leonard Berkowitz, Elizabeth, N.J., assignor to Esso Research and Engineering Company, a corporation of Delaware
Filed Mar. 6, 1963, Ser. No. 263,165
3 Claims. (Cl. 260—78.5)

This invention relates to improvements in the art of manufacturing polymeric additives for mineral oils, and especially for the higher boiling hydrocarbon oils in the general classification of middle distillate fuels and lubricating oils. The invention is particularly directed to the prevention of both gel formation and oil insoluble material formation in polymers that contain carboxyl and hydroxyl groups.

High molecular weight polymers and copolymers comprising mixed esters of unsaturated dicarboxylic acids including maleates, fumarates, itaconates and the like have been used in the past as additives for lowering the pour point, raising the viscosity index and improving the sludge dispersing properties of heating oils and lubricating oils. However, preparation of these polymers and copolymers of esterified unsaturated dicarboxylic acids has been complicated by a cross linking phenomenon which causes gelation. This gelation occurs during the polymerization reaction and thus prevents the polymerization from being carried to completion.

A possible solution has been advanced in a copending, coassigned application, Ser. No. 109,878, filed May 15, 1961 by Joel R. Siegel and Hugh H. Horowitz, wherein the esterified monomer or a solution thereof in solvents, such as ether or hexane, is treated with anhydrous ammonia or with an ammonia derivative, i.e. an alkyl amine, an aryl amine or a quaternary ammonium hydroxide. The method involved the saturation of the esterified monomer solution with the base followed by removal of excess base and solvent by nitrogen blowing and heating or by vacuum stripping. The polymerization was then carried out on this material in the usual manner.

However, while the esterified monomer could be polymerized without gelation after the above treatment, other disagreeable properties were introduced. In the first place, the ammoniated ester monomer produces large amounts of sediment during the polymerization. The physical form of this sediment varies from amorphous to hard beads which makes the additive filtration very difficult. Secondly, the resulting polymers from ammoniated ester monomers are hazy even though they will filter readily. This haze detracts from the marketability of the polymers as oil additives and is not removed by filtration, even when filter aids are used. Thirdly, extensive ammoniation causes polymerization of the ester monomers. This may occur to such a large extent as to prevent this prepolymerized material from being copolymerized with organic monomers containing vinyl groups, which copolymers form the class of desired oil additives.

The extent of this prepolymerization can be easily determined by testing the ammoniated ester in a polarograph. A comparison between the amount of nitrogen introduced and the extent of prepolymerization is given in Table I.

TABLE I

| Percent nitrogen in ester | Polarograph wave height/ gm. sample | Percent double bonds reacted [1] |
|---|---|---|
| 0 | 190 | 0 |
| 0.45 | 187 | 1 |
| 0.50 | 178 | 6 |
| 0.61 | 166 | 12 |
| 0.79 | 167 | 12 |
| 0.83 | 183 | 4 |
| 1.34 | 142 | 25 |
| 1.50 | 110 | 42 |
| 1.87 | 132 | 31 |
| 2.45 | 60 | 68 |
| 3.52 | 22 | 88 |
| 4.35 | 15 | 92 |

[1] Using the unammoniated ester as the base.

It has now been discovered that the undesirable side effects of the ammoniation of the mixed esters of unsaturated dicarboxylic acids can be eliminated by using only the quantity of ammonia or ammonia derivative that will yield a critical nitrogen concentration range in the ester. The mixed ester monomer resulting from this treatment will copolymerize with organic monomers containing a vinyl group without gelation, and further will yield a sediment-free, clear polymer eminently suitable for additive use.

It has further been found that treating alkyl half-ester unsaturated dicarboxylic acids with a small excess, e.g. 3 to 20%, preferably 8% excess over the stoichiomeric amount of an alkylene oxide or derivative thereof, to form the mixed ester unsaturated dicarboxylic acids, results in a monomer which will yield substantially sediment-free polymers when copolymerized with organic monomers containing a vinyl group with less criticality of ammoniation treatment. Additionally, if these monomeric mixed esters unsaturated dicarboxylic acids are ammoniated, they will yield non-gelating, sediment-free, clear copolymers at much lower critical nitrogen concentration ranges than the ester monomers treated with the stoichiometric amount of an alkylene oxide or derivative thereof.

The invention is particularly applicable to polymers made from monomers of alkoxy esters of unsaturated dibasic acids or from monomers of alkyl haloalkoxy esters of unsaturated dibasic acids. The alkoxy esters referred to are derived from unsaturated dibasic acids which are first partially esterified with an aliphatic alcohol and then further reacted with an alkylene oxide. The alkyl haloalkoxy esters referred to may be obtained by first reacting an unsaturated dibasic acid with an aliphatic alcohol to form a half ester and then further reacting the half ester with a small excess over the stoichiometric amount needed of a halogen derivative of an alkylene oxide having from 3 to 10 carbon atoms, e.g. epichlorohydrin, in the presence of a basic catalyst. Suitable unsaturated dibasic acids that can be used for preparing either of the types of esters involved in this invention include maleic acid, fumaric acid, citraconic acid, mesaconic acid, and itaconic acid. The preferred acids are the butanedioic acids, i.e., maleic and fumaric acids. It is also understood that the respective anhydrides of the acids described above may be utilized without prejudicing the outcome of the reaction.

When preparing the alkoxy esters, the unsaturated dibasic acid is partly esterified with any aliphatic alcohol, although such alcohols having from 3 to 24 carbon atoms per molecule are preferred, and those having from 6 to 18 carbon atoms per molecule are particularly preferred.

The alcohols may be of straight-chain or branched configuration, and those alcohols produced by the "Oxo" process which are well known in the art preferred. It is within the scope of the invention to use a mixture of such alcohols. By the term "partly esterified" is meant that less than two gram molecules of alcohol is reacted with a gram molecule of organic dibasic acid during the esterification process. Particularly useful proportions of reactants include 1 gram molecule of dibasic acid with from about 1 to about 1.5 gram molecules of alcohol. The product is probably a mixture of diesters, half esters and some unesterified acid. When the acid anhydrides are used, the product can be essentially pure half ester.

The partly esterified unsaturated dibasic acid is reacted with any alkylene oxide to produce the corresponding alkoxy ester compounds. The alkylene oxide used is preferably one which contains from 2 to 6 carbon atoms per molecule, and most preferably is ethylene oxide or propylene oxide. The reaction of the partially esterified acid with the alkylene oxide may be carried out by any well-known chemical method, for instance at temperatures of about 260° F. and in the presence of a base, e.g., sodium hydroxide, potassium hydroxide, sodium ethoxide, sodium carbonate, etc. Sodium hydroxide is a most preferred base.

The alkyl haloalkyleneoxy ester derived from an epihalohydrin gives the the following product (plus some isomers).

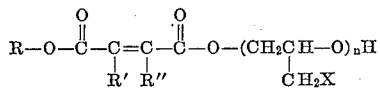

where R is an alkyl group containing from about 3 to about 24 carbon atoms; R' and R" are constituents selected from the class consisting of hydrogen atoms and methyl groups, at least one such constituent being a hydrogen atom; $n$ may vary from one to three or more, depending upon the quantity of haloalkylene oxide employed in preparing the ester; and where X is chosen from the class of halogen radicals. Derivatives of higher molecular weight haloalkylene oxides will have similar structures. A most preferred group of alkyl haloalkyleneoxy esters is described when R is an alkyl group containing 8 to about 18 carbon atoms; R' and R" are hydrogen atoms; $n$ is one; and when X is a chlorine atom.

A preferred alkyl haloalkyleneoxy ester is prepared by reacting the half ester derived from maleic acid (or anhydride) and $C_8$ "Oxo" alcohol with epichlorhydrin in the presence of a basic catalyst, e.g., sodium hydroxide. The temperature at which the addition is carried out may range between about 150° F. and 300° F. The reactants are held at this temperature from about 3 hours to about 25 hours or longer. The epichlorohydrin, preferably in about 8% excess over the equimolar amount, will add to the half ester through the epoxy group under these conditions and the chlorine atom of the epichlorohydrin is unaffected. The reaction may be carried out in a suitable solvent such as benzene, toluene, xylene, heptane, hexane, or the like, if desired.

To prepare useful additives for lubricating oil and fuel oil compositions, the alkoxy esters or the alkyl haloalkeneoxy esters are copolymerized with other polymerizable organic monomers containing a vinyl group. Suitable monomers containing vinyl groups include hydrocarbons such as styrene, isobutylene, and butadiene; esters such as allyl acetate, vinyl acetate, vinyl propionate and methyl methacrylate; ethers such as allyl ethyl ether and butyl vinyl ether; nitriles such as acryonitrile and vinylacetonitrile. Mixtures of such monomers containing vinyl groups with other copolymerizable materials, long chain alcohol esters of unsaturated conjugated dibasic acids such as lauryl maleate and stearyl fumarate, for example, may also be used. Vinyl esters of short chain fatty acids, particularly vinyl acetate, and mixtures of such esters with fumarate or maleate esters of long chain aliphatic alcohols containing from about 8 to about 20 carbon atoms per molecule are preferred monomers for the preparation of copolymers with the esters.

The copolymerization of the ester with the organic monomer may be carried out in a solution of benzene, heptane, hexane, while oil, or other suitable organic solvent at a temperature in the range from about 60° F. to about 250° F. and may be promoted by gamma radiation or by the use of a peroxide-type catalyst such as benzoyl peroxide, tert. butyl perbenzoate, a hydroperoxide or an azo catalyst such as alpha, alpha'-azo-bis-isobutyronitrile. The mole ratio of ester to other organic monomers in the polymerization mixture may be varied from about 2:1 to about 1:20 and is preferably in the range of from about 1:1 to about 1:10. The polymerization may be carried out in a suitable solvent in order to control reaction velocity and molecular weight. Oxygen may be excluded during the polymerization by the use of a blanket of an inert gas such as nitrogen or carbon dioxide. The polymerization time may vary from about 1 to 36 hours.

Polymerization of the ester and the organic monomer proceeds between the unsaturated double bonds in the acid portion of the ester and in the monomer. The copolymer may have molecular weights of from about 3000 to about 100,000 or higher. The molecular weight can be determined by measuring the viscosity of diisobutylene solutions containing 5 mg. of the copolymer per cc. and applying the Staudinger equation. Molecular weights of from about 6,000 to about 30,000 are particularly preferred. Upon completion of the polymerization reaction, the copolymer may be freed of solvent and employed as an additive for fuel oil or lubricating oil in concentrations of from about 0.001 to about 20 weight percent.

In accordance with the present invention, prior to the polymerization of the esters of unsaturated dibasic acids of the types described, or of the copolymerization of those esters with other monomers, the esters are treated with ammonia or with ammonia derivatives of the class consisting of alkyl amines, aryl amines and quaternary ammonium hydroxides.

The alkyl amines that may be employed are selected from the group consisting of saturated alkyl monoamines, diamines and triamines having from 1 to 18 carbon atoms in the alkyl groups. The aryl amines are selected from the group containing one benzene ring. The ammonia derivative chosen should preferably be one whose conjugate salt has a $K_a$ (dissociation constant) that is less than the $K_a$ of the acid groups in the polymers that are treated.

Specific ammonia derivatives that may be employed in practicing the invention include methyl amine, ethyl amine, propyl amine, tetramethyl ammonium hydroxide, dimethyl amine, aniline, dodecyl amine, cetyl amine, tetramethyl ammonium hydroxide, methyl aniline, and tricoco-methyl ammonium hydroxide.

FIGURE 1 shows a graph wherein the amount of sediment found in additives is plotted against the percent nitrogen introduced in the ester by ammoniation, which ester was subsequently copolymerized to yield the additive. One series of points traces the sediment formed in additives prepared from ammoniated $C_8$ Oxo chloropropyleneoxy maleate which in turn had been prepared by reacting the half ester, $C_8$ Oxo hydrogen maleate, with an equimolar amount of epichlorohydrin followed by ammoniation to the respective nitrogen concentration levels given. A second series of points indicates the sediment formed in additives prepared from ammoniated $C_8$ Oxo chloropropyleneoxy maleate which in turn had been prepared by reacting the above said half ester with an 8% excess over the equimolar amount of epichlorohydrin followed by ammoniation to the various nitrogen concentration levels shown.

Additionally, the graph indicates some physical characteristics of the resulting additive polymers in relation to the concentration of nitrogen in the basic ester, e.g. zones of slow filtration due to sediment or gels, zones wherein the polymers are hazy and zones wherein the polymers are clear or rapidly filterable are shown. As stated previously, the most desirable polymers are non-gelling, rapidly filterable, and sediment and haze free. Thus it is evident from FIGURE 1 that in order to obtain such polymers from esters prepared with equimolar amounts of an alkylene oxide or derivative thereof, it is necessary to control the ammoniation so that only a critical range of nitrogen content is obtained in the ester. This would correspond to 1.8% to 2.0% nitrogen.

On the other hand, if the ester was prepared with an excess of alkylene oxide or derivative, no significant amounts of sediment were obtained. The critical level of nitrogen concentration for these esters was lowered to 1.1 to 2.0%. Furthermore, the breadth of the critical range is wider for the ester formed with excess alkylene oxide or derivative thereof than for the ester treated with equimolar amounts of that reagent.

It is therefore evident that control of the degree of ester ammoniation is extremely important. FIGURE 2 shows a graph wherein the viscosity (cs. 100° F.) is plotted against the percentage of nitrogen in the ammoniated esters. This graph clearly indicates that the ester viscosity is an extremely precise and reliable control. It has further been found that the correlation holds true independent of the ammoniation conditions and the ester neutralization number. Therefore by continuously monitoring the viscosity of the ester, it is possible to ammoniate to virtually the exact nitrogen concentration desired. The viscosity range for the ammoniation of the esters prepared with an equimolar amount of alkylene oxide or derivative thereof would therefore be 700 to 900 centistokes (100° F.). Correspondingly the viscosity range for the ammoniation of the ester prepared with an excess amount of alkylene oxide or derivative thereof would be 260–900 centistokes.

An alternative control method utilizing the pH of a toluene/isopropanol/water solution of the ester is shown to be possible in FIGURE 3 wherein the pH is plotted against the percentage of nitrogen in the ester. However this method is not as desirable as the viscosity method as it is less accurate and is dependent on the neutralization number of the ester. It does have the advantage of being a faster means of following the reaction and therefore can be used when speed is the more important consideration.

The nature of this invention and the manner in which it may be practiced will be more fully appreciated from the following examples.

EXAMPLE I

The half ester of maleic acid is prepared by adding 592 gms. of $C_8$ Oxo alcohol to 443 gms. of maleic anhydride in 206 gms. of heptane at 140° F. The temperature is maintained at about 140° F. during the course of the reaction by means of external cooling. Sodium hydroxide in the amount of 0.66 gm. is then added and the reaction mixture is heated to about 220° F. at which time 416 gms. of epichlorohydrin is added. The temperature is held at 220° F. until the neutralization number (determined by ASTM D–974 procedure) drops to about 40 (approximately 10 hrs.). Solvent and unreacted epichlorohydrin are stripped off in vacuo and the remaining solution is cooled to 100° F. Dry ammonia gas is bubbled through the ester solution until the viscosity reaches 820 cs. This is equivalent to a nitrogen concentration of 1.9% in the ester. The solution is stripped briefly in vacuo under a nitrogen stream to remove dissolved ammonia. Yield of ammoniated $C_8$ Oxo chloropropyleneoxy maleate is 1440 gms.

EXAMPLE II

The process of Example I is followed using 449 gms. (approximately 8% excess) of epichlorohydrin. The temperature is held at 220° F. until the neutralization number drops below 20 (about 20 hours). Dry ammonia gas is added until the viscosity reaches 460 cs. at 100° F., which is equivalent to 1.5% nitrogen. The yield of ammoniated $C_8$ Oxo chloropropylenoxy maleate is 1460 gms.

EXAMPLE III

The process of Example I is followed, but in place of epichlorohydrin, ethylene oxide is bubbled through the reaction mixture at 250° F. until 213 gms. (approximately 8% excess) is absorbed. Dry ammonia gas is added until the nitrogen content reaches 1.5%. The product is ammoniated $C_8$ Oxo ethyleneoxy maleate.

EXAMPLE IV $C_8$ Oxo chloropropyleneoxy maleate, 52 gms., derived from either the process of Example I or Example II is mixed with 300 gms. of tallow fumarate (mixture of cetyl and stearyl) and 75 gms. of white oil. The mixture is heated to 130° F. and purged with nitrogen. To the above mixture is added 58 gms. of vinyl acetate, 75 gms. of heptane and 4.1 gms. of benzoyl peroxide. The reactants are purged with nitrogen once again and then the mixture is heated to 170° F. This temperature is maintained within ±5° F. until total fumarate and maleate conversion is 95% or greater as determined by polarographic analysis. If this conversion is not reached after 8 hours of reaction, an additional 2 gms. of benzoyl peroxide is added. A further addition of 6 gms. of vinyl acetate is made if the additional benzoyl peroxide does not complete the reaction. When the reaction is completed, 0.5 gm. of sulfur is added and the solution is then stripped at 200° F. to 150° F. flash point. About 94 gms. of kerosene is blended in and the mixture is then filtered. The yield of copolymer is 400 gms.

EXAMPLE V

The process of Example IV is followed utilizing the ammoniated $C_8$ Oxo ethyleneoxy maleate prepared in Example III and using the same stoichiometric proportions outlined in Example IV.

Copolymers prepared in the above manner but using $C_8$ Oxo chloropropyleneoxy maleates containing different nitrogen concentrations were compared as to their physical properties as fuel oil additives. The results are summarized in Table II given below.

TABLE II

| Percent nitrogen in ester [1] | Ester viscosity cs. 100° F. | Percent ester[2] polymerized during ammoniation | Gel [3] | Sediment [4] | Filter rate | Haze |
|---|---|---|---|---|---|---|
| 0 | 65 | 0 | Yes | None | Low | None. |
| 1 [5] | 225 | 10 | Yes | do | do | Do. |
| 1.9 (Example I) | 820 | | No | do | High | Do. |
| 1.5 (Example II) | 460 | | No | do | do | Trace. |
| 1.75 [5] | 700 | 60 | No | Much | Low | None. |
| 2.5 [5] | 2,000 | 70 | No | None | High | Some. |
| 3.5 [5] | | 88 | No | do | do | Much. |
| 4.3 [6] | | 93 | No | Much | Low | Do. |

[1] Introduced by ammoniation.
[2] Disappearance of double bonds measured polarographically.
[3] Gel produced during polymerization.
[4] Insoluble materials produced during polymerization.
[5] Same as Example I except for degree of ammoniation.
[6] Ester polymerized too much to copolymerize completely with other monomers.

The above results clearly indicate the superiority of copolymers prepared from esters ammoniated to a critical nitrogen concentration. These copolymers are obtained in high yield and have no undesirable physical properties for use as fuel or heating oil additives. This is clearly shown by the results of carbon black dispersancy tests and sediment stability tests shown in Tables III and IV. In fact these additives are far superior to a commercially available additive shown for comparative purposes.

TABLE III

*Carbon black dispensancy test [1]*

| Additive | Base stock | Mg. carbon black dispersed in 50 ml. | | | | |
|---|---|---|---|---|---|---|
| | | 5 min. | 15 min. | 1 hr. | 4 hrs. | 24 hrs. |
| None [2] | 1 | 85 | 43 | 20 | | |
| 70 p.p.m. Example IV [4] | 1 | 86 | 62 | 44 | 35 | |
| 70 p.p.m. additive A [5] | 1 | 89 | 59 | 22 | 5 | |
| None [3] | 2 | 78 | 31 | 13 | 5 | 0 |
| 100 p.p.m. Example IV | 2 | 93 | 80 | 46 | 32 | 16 |
| 100 p.p.m. additive A | 2 | 95 | 64 | 17 | 8 | 2 |

[1] One gram of carbon black is dispersed in 500 ml. test fuel by 5 minutes stirring in a Waring Blendor, then separated into five 100 ml. portions. At the specified times, the top 50 mls. are pipetted out and the weight of suspended carbon black is determined.
[2] No. 2 heating oil base stock sample 1.
[3] No. 2 heating oil base stock sample 2.
[4] Prepared from Example II.
[5] Commercially available dispersant.

TABLE IV

*265° F. sediment stability test [1]*

| Additive | Base stock | Milligrams sediment/100 ml. | |
|---|---|---|---|
| | | 3 hours | 6 hours |
| None [2] | 1 | 1.2 | 4.2 |
| 7 p.p.m. Example V | 1 | 0.3 | 0.7 |
| 70 p.p.m. additive A [4] | 1 | 0.3 | 4.5 |
| None [3] | 2 | 4.4 | 5.0 |
| 70 p.p.m. Example V | 2 | 0.4 | 0.8 |
| 70 p.p.m. additive A | 2 | 1.7 | 5.5 |

[1] Middle distillate oil is held at 265° F. for specified time while saturated with air.
[2] No. 2 heating oil base stock sample 1.
[3] No. 2 heating oil base stock sample 2.
[4] Commercially available dispersant.

The examples are presented merely for the purpose of illustration and should not be regarded as limiting the invention in any manner. Numerous modifications may occur to those skilled in the art which may be made without departing from the spirit of the invention disclosed herein.

What is claimed is:

1. In the preparation of an oil-soluble addition polymer by polymerization of a monomer selected from the group consisting of (a) alkoxy esters obtained by reacting a half-ester of an ethylenically unsaturated $C_4$ to $C_5$ dicarboxylic acid and a $C_2$ to $C_6$ alkylene oxide; and (b) alkyl chloropropyleneoxy esters having the formula:

$$R-O-\underset{\underset{R'}{|}}{\overset{\overset{O}{\|}}{C}}-C=C-\underset{\underset{R''}{|}}{\overset{\overset{O}{\|}}{C}}-O-(CH_2CH-O)_nH \quad \underset{CH_2Cl}{}$$

where R is an alkyl group containing from about 3 to about 24 carbon atoms; R' and R" are constituents selected from the group consisting of hydrogen atoms and methyl groups, at least one such constituent being a hydrogen atom, and $n$ is from 1 to about 3; wherein said monomer is contacted with a nitrogen compound selected from the group consisting of ammonia, alkyl amines, aryl amines, and quaternary ammonium hydroxides at a temperature in the range of from about 40° F. to about 135° F. prior to said polymerization; said polymerization reaction being a type selected from the group consisting of solution and bulk polymerization and which is catalyzed by catalysts selected from the group consisting of free-radical radiation and heat; the improvement for preventing sedimentation and haze resulting from said polymerization which comprises employing said nitrogen compound in amounts so as to incorporate from 1.8 to 2.0 wt. percent nitrogen within said monomer.

2. The improvement as defined by claim 1 wherein said monomer is copolymerized with an organic polymerizable monomer containing a vinyl group in a molar ratio of monomer to vinyl group-containing monomer in the ratio of from about 2:1 to about 1:20, subsequent to said treatment with said nitrogen compound.

3. The improvement as defined by claim 1 wherein said alkylene oxide is added in an amount of from about 3 to 20% excess of equimolar amounts and wherein said nitrogen compound is utilized in amounts so as to incorporate from 1.1 to 2.0 wt. percent nitrogen within said monomer.

References Cited by the Examiner

UNITED STATES PATENTS

| 2,681,897 | 6/1954 | Frazier et al. | 260—850 |
| 2,737,496 | 3/1956 | Catlin | 252—51.5 |
| 2,962,443 | 11/1960 | Rhodes | 252—56 |
| 3,002,959 | 10/1961 | Hicks | 260—88.1 |
| 3,010,906 | 11/1961 | Signourit et al. | 252—56 |

FOREIGN PATENTS

| 569,574 | 1/1959 | Belgium. |
| 854,658 | 11/1960 | Great Britain. |

JOSEPH L. SCHOFER, *Primary Examiner.*

DANIEL E. WYMAN, *Examiner.*

P. P. GARVIN, L. WOLF, *Assistant Examiners.*